United States Patent
Fisher et al.

(10) Patent No.: US 8,359,279 B2
(45) Date of Patent: Jan. 22, 2013

(54) ASSISTED CLUSTERING

(75) Inventors: Danyel A. Fisher, Seattle, WA (US); Sumit Basu, Seattle, WA (US); Steven Drucker, Bellevue, WA (US); Gonzalo A. Ramos, Bellevue, WA (US); Hao Lu, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 419 days.

(21) Appl. No.: 12/787,945

(22) Filed: May 26, 2010

(65) Prior Publication Data

US 2011/0295773 A1   Dec. 1, 2011

(51) Int. Cl.
*G06N 5/00* (2006.01)

(52) U.S. Cl. .............................. 706/11; 706/45

(58) Field of Classification Search .................. 706/11, 706/45
See application file for complete search history.

(56) References Cited

U.S. PATENT DOCUMENTS

| | | |
|---|---|---|
| 6,449,612 B1 | 9/2002 | Bradley et al. |
| 2006/0089924 A1 | 4/2006 | Raskutti et al. |
| 2007/0239745 A1 | 10/2007 | Guerraz et al. |
| 2008/0249999 A1 | 10/2008 | Renders et al. |
| 2009/0287668 A1 | 11/2009 | Evans et al. |

OTHER PUBLICATIONS

Chen, et al., ClusterMap: Labeling Clusters in Large Datasets via Visualization, CIKM'04, Nov. 8-13, 2004, pp. 1-9.*
Kreulen, et al., "An Interactive Approach to Document Classification", Retrieved at <<http://www.almaden.ibm.com/asr/projects/biw/publications/eClassifier-white-paper.doc>>, Mar. 1999, pp. 1-20.
Awasthi, Pranjal., "Interactive clustering", Retrieved at <<www.cs.cmu.edu/~pawasthi/interactive_clustering.pdf>>, 2009, pp. 6.
O'Neill, et al., "DISCO: Intelligent Help for Document Review", Retrieved at <<http://www.law.pitt.edu/DESI3_Workshop/Papers/DESI_III.XeroxEurope_ONeill.XeroxEurope.>>, Workshop DESI at ICAIL 2009 (12th International Conference on Artificial Intelligence & Law), Jun. 8, 2009, pp. 1-10.
Godbole, et al., "Document Classification Through Interactive Supervision of Document and Term Labels", Retrieved at http://www.godbole.net/shantanu/pubs/hiclass-pkdd04.pdf>>, Lecture Notes in Computer Science, vol. 3202, Proceedings of the 8th European Conference on Principles and Practice of Knowledge Discovery in Databases, Sep. 20-24, 2004, pp. 12.
M. Czerwinski et al., "Visualizing Implicit Queries for Information Management and Retrieval," Proceedings of the SIGCHI Conference on Human Factors in Computing Systems: the CHI is the Limit (Pittsburgh, Pennsylvania, U.S., May 15-20, 1999), CHI '99, ACM, New York, NY, pp. 560-567.
C. Seifert et al., "A Novel Visualization Approach for Data-Mining-Related Classification," 2009 13th International Conference Information Visualization, IEEE, 2009, pp. 490-495.

* cited by examiner

*Primary Examiner* — Wilbert L Starks

(57) ABSTRACT

Assisted clustering systems and methods are described herein that provide a user interface by which a user can easily create clusters and selectively associate data items with such clusters. Information regarding data item-cluster associations made by the user is processed by a recommendation engine to learn a clustering model. The clustering model is then be used to generate recommendations for the user regarding which unassociated data items should be associated with which clusters. In certain embodiments, after the user has determined that the clustering model is performing at a satisfactory level based on the quality of the recommendations, the user can cause the system to automatically cluster a large quantity of remaining unassociated data items. In accordance with further embodiments, a user can specify arbitrary data item types for clustering as well as features of such data types that should be considered in generating the clustering model.

20 Claims, 12 Drawing Sheets

ASSISTED CLUSTERING

BACKGROUND

The daily lives of information workers abound with clustering and categorization problems. Faced with a large number of documents, data records, or other items, their task is to group things into categories. This is important for applications as broadly varied as categorizing bugs, sorting user feedback, grouping machines in an organization, sorting job applications, and many others. Users faced with such tasks are often in desperate need of machine assistance, especially when overwhelmed by large numbers of items. Applying traditional clustering algorithms to such tasks is generally not helpful. This is because, to be effective, such algorithms require identifying an appropriate "distance metric" for determining how items are related to one another in terms of their features. This is something that users may not know, or at the least may be difficult for them to express. Furthermore, even if an appropriate distance metric can be determined, the application of such a metric may not result in the desired clustering in all cases.

Recently, there has been a steady stream of work in the literature concerning "interactive clustering." In accordance with interactive clustering, a user provides assistance to a learning algorithm in automatically clustering items. The methods proposed typically involve obtaining input from users in the form of "must-link" and "cannot-link" constraints, which specify whether two items belong together or apart. These constraints are then used to learn a distance metric, after which traditional clustering mechanisms such as k-means can be used to group items. It has been observed, however, that specifying such "must-link" and "cannot-link" constraints is not a natural part of users' behavior when performing a clustering task. Rather, users typically prefer to make semantically meaningful clusters and incrementally add items to them. The methods proposed in the literature do not leverage this user behavior in any way to perform interactive clustering. Furthermore, the distance metrics derived using the aforementioned methods may still lead to disappointing results.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

Assisted clustering systems and methods are described herein. In accordance with certain embodiments, such systems and methods provide a user interface by which a user can easily create clusters and selectively associate data items with such clusters. Information regarding data item-cluster associations made by the user is processed by a recommendation engine to learn a clustering model. The clustering model is then be used to generate recommendations for the user regarding which unassociated data items should be associated with which clusters. In certain embodiments, after the user has determined that the clustering model is performing at a satisfactory level based on the quality of the recommendations, the user can cause the system to automatically cluster a large quantity of remaining unassociated data items. In accordance with further embodiments, a user can specify arbitrary data item types for clustering as well as features of such data types that should be considered in generating the clustering model.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

FIG. 1 is a block diagram of an example assisted clustering system in accordance with an embodiment.

FIGS. 2-6 respectively depict example display screens that may be rendered by an assisted clustering system in accordance with an embodiment.

Figure 12:
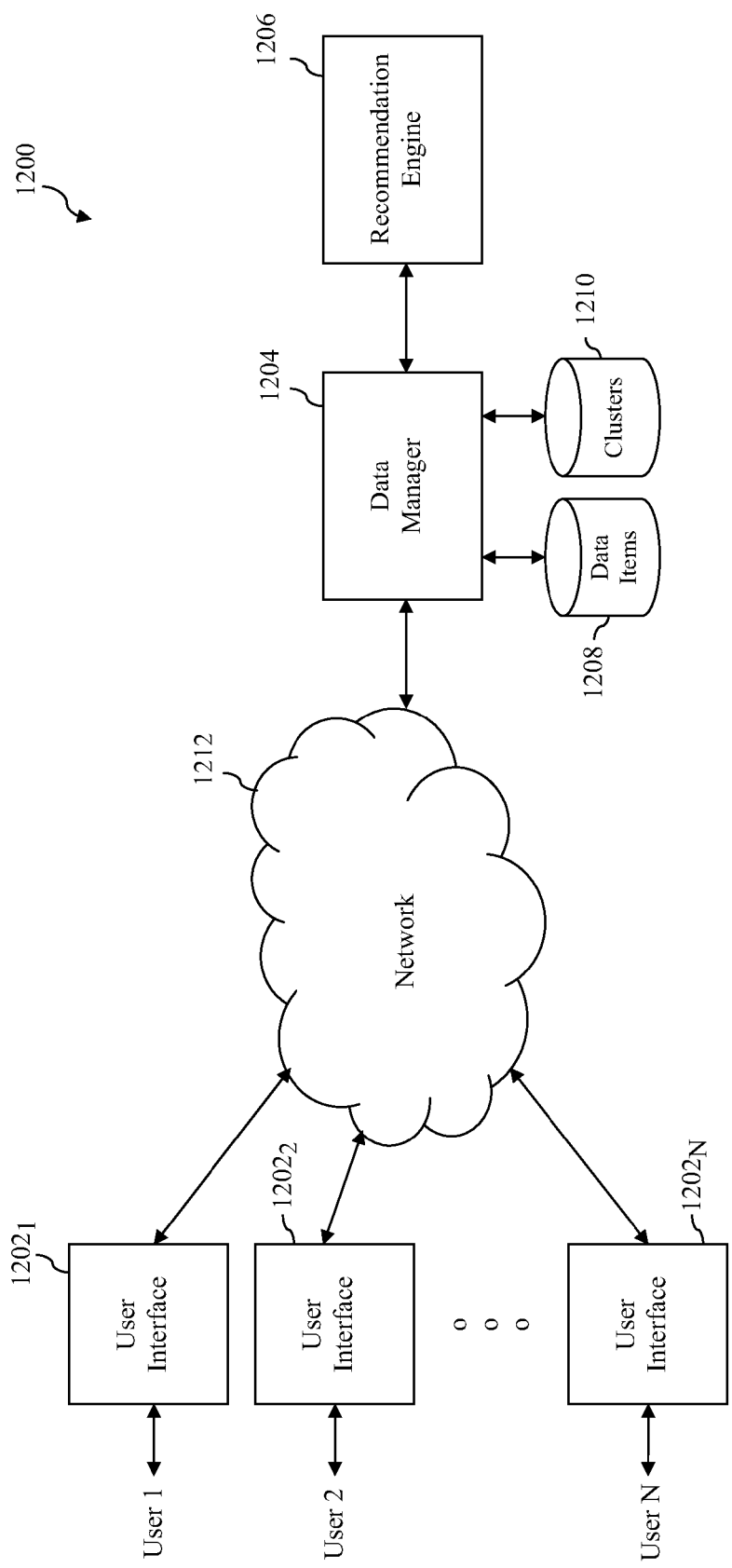

FIG. 12 is a block diagram of an example networked computing system that may be used to implement an assisted clustering The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

An assisted clustering system is described herein that provides a user interface by which a user can easily create clusters and selectively associate data items with such clusters. The assisted clustering system advantageously derives input for generating a clustering model from the natural behavior of the user who is performing the clustering task. For example, in certain embodiments, "must-belong" and "cannot-belong" constraints are derived from the actions of users when creating semantically meaningful clusters and incrementally adding items to them.

Information regarding data item-cluster associations made by the user is processed by a recommendation engine to learn a clustering model. The clustering model is then used to generate recommendations for the user regarding which unassociated data items should be associated with which clusters. As the user's understanding of the content of the different data items evolves and as the user places more and more data items in different clusters, the recommendation engine iteratively improves its recommendations based on such activities. The user is free to choose to follow or ignore such recommendations. This leaves the user in control of the clustering task if the user so chooses.

In certain embodiments, after the user has determined that the clustering model is performing at a satisfactory level based on the quality of the recommendations, the user can cause the system to automatically cluster a large quantity of remaining unassociated data items. In accordance with further embodiments, a user can specify arbitrary data item types for clustering as well as features of such data types that should be considered in generating the clustering model.

II. Example Assisted Clustering System

Figure 1:
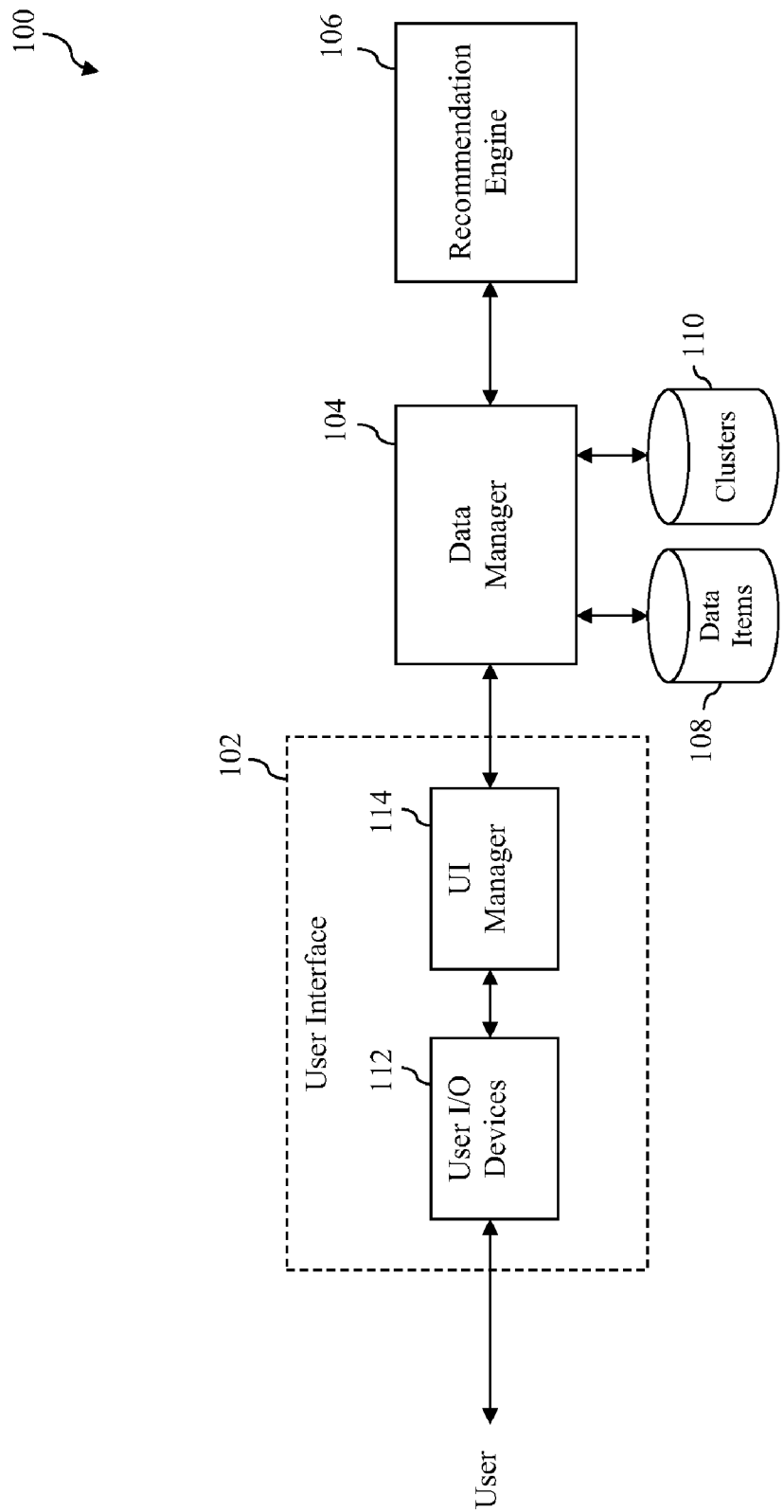

FIG. 1 is a block diagram of an assisted clustering system 100 in accordance with an embodiment. System 100 enables a user to review data items in a collection of data items and organize such data items into different categories in a machine-assisted manner. As shown in FIG. 1, system 100 includes a user interface 102, a data manager 104 and a recommendation engine 106. Each of these elements will now be described with continued reference to FIG. 1 and with reference to certain example user interface screens depicted in FIGS. 2-6.

As shown in FIG. 1, user interface 102 includes user input and output (I/O) devices 112 and a user interface (UI) manager 114. In one implementation, user I/O devices 112 comprise at least one display by which a user can perceive images rendered by system 100 and at least one input device by which the user can interact with graphical objects rendered to the display by system 100. Examples of such input devices include, but are not limited to, a mouse, a keyboard, a touch screen, a touch pad, a joystick, a trackball, a pointing stick, a game controller or gamepad, a motion tracking sensor, or a video capture device such as a camera. However, these examples are not intended to be limiting and other types of user input devices other than those listed herein may be used.

UI manager 114 comprises logic that manages the delivery of output to a user via one or more of user I/O devices 112 and that processes user input received via one or more of user I/O devices 112. By so doing, UI manager 114 implements a user interface by which a user can review data items in a collection of data items and selectively associate such data items with different clusters. In one embodiment, UI manager 114 implements a graphical user interface (GUI) by rendering representations of data items and clusters to a display and by processing user input received via one or more input devices to allow the user to interact with such data item and cluster representations.

Figure 2:
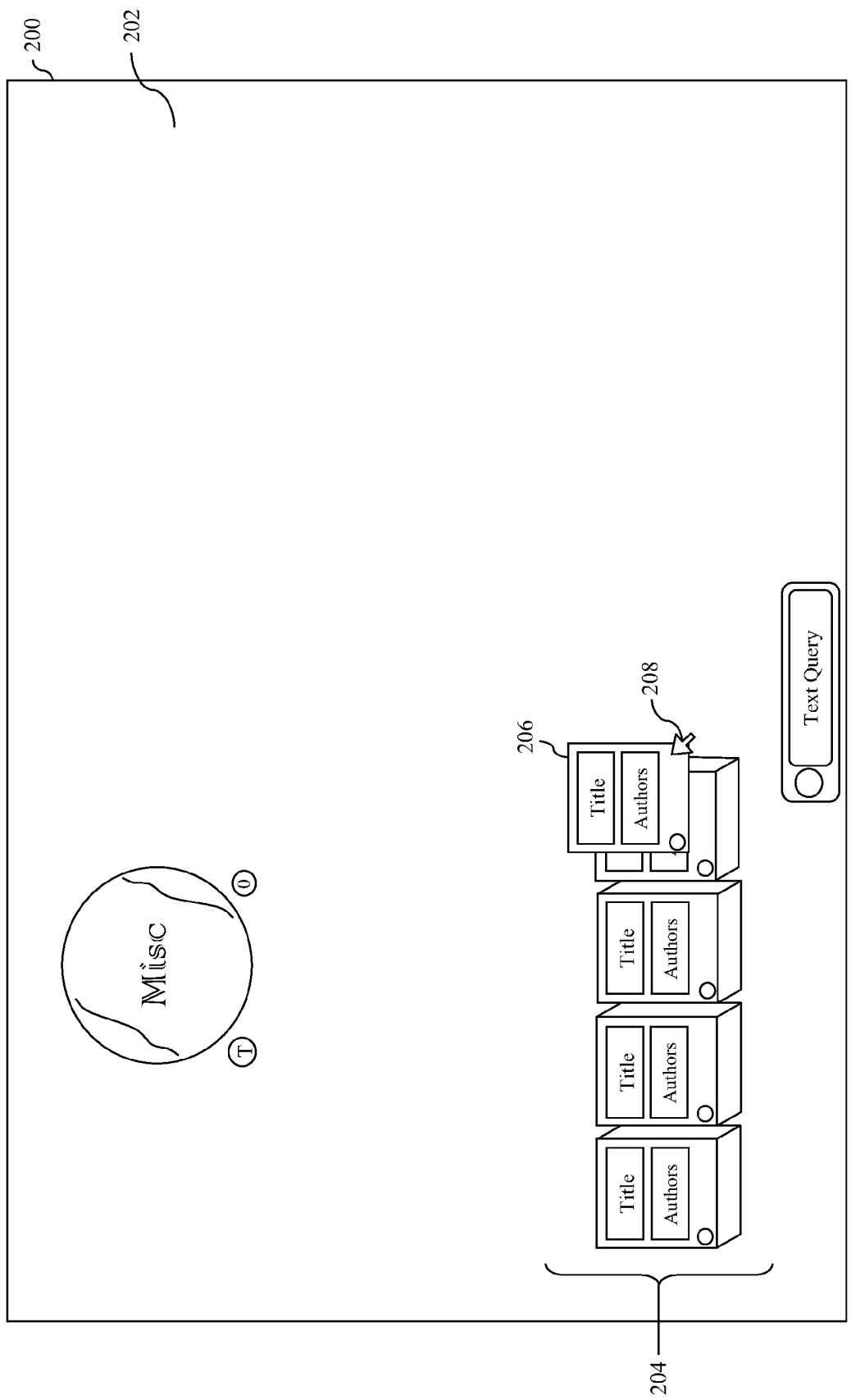

By way of example, FIG. 2 depicts a display screen 200 that may be rendered to a display by UI manager 114 in accordance with one embodiment. Display screen 200 comprises a representation of a canvas 202 upon which is displayed a plurality of data item representations 204. Each data item representation represents a data item in a collection of data items to be clustered. In the particular embodiment associated with FIG. 2, each data item representation represents a different academic paper in a collection of academic papers. However, this is merely one example, and a wide variety of data items may be represented and clustered using system 100 as will be discussed in further detail herein. As shown in FIG. 2, each academic paper is represented by a "trading card" that includes both the title of the paper and the authors thereof.

In accordance with the embodiment associated with FIG. 2, each data item representation may be selected and then moved to another portion of canvas 202. For example, a user input device such as a mouse may be used to direct an on-screen pointer 208 to a particular data item representation 206, which can then be selected and moved to another part of canvas 202 using "drag-and-drop" functionality or like functionality. The details associated with implementing such functionality will be well known to persons skilled in the art of GUI design. In further accordance with the embodiment associated with FIG. 2, to facilitate the maintenance of an organized canvas, only a limited number of data item representations are initially displayed, and the existence of other data item representations is signified by the appearance of stacks beneath the displayed data item representations. To access additional data item representations, a data item representation at the top of one of the stacks must be moved to another portion of canvas 202.

In accordance with a further embodiment, in response to the performance of a particular user interaction with a data item representation (e.g., double-clicking on the data item representation), UI manager 114 will cause additional information concerning the corresponding data item be displayed to the user. Such additional information may include, for example, additional contents of the data item and/or metadata concerning the data item. In an embodiment in which each data item is an academic paper, performing the particular interaction with the data item representation causes a full abstract of the corresponding academic paper to be displayed to the user.

To obtain the information associated with a data item that is necessary for generating a data item representation and/or for displaying other information concerning a data item to a user, UI manager 114 communicates with data manager 104. As shown in FIG. 1, data manager 104 is capable of accessing a data item database 108 that stores the complete collection of data items, including the contents of each data item and any metadata associated therewith, and is thus capable of providing the necessary information.

Figure 3:
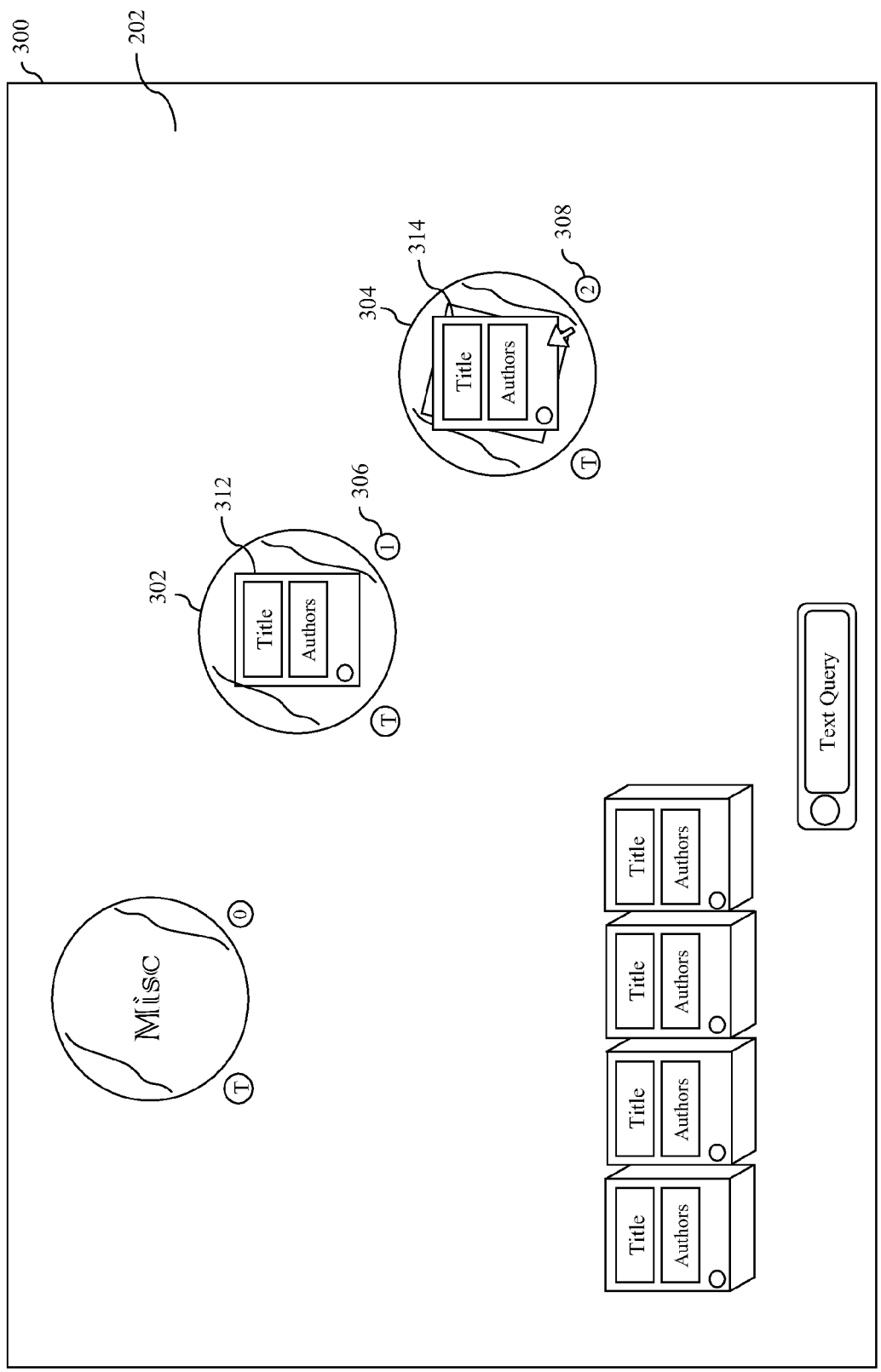

UI manager 114 is further capable of enabling a user to create clusters and to associate one or more data items in the collection of data items with each cluster. By way of example, FIG. 3 depicts a further display screen 300 that may be rendered to a display by UI manager 114 in accordance with an embodiment. Display screen 300 comprises a representation of canvas 202 after a user of system 100 has created a first cluster, which is represented by a first cluster representation 302, and a second cluster, which is represented by a second cluster representation 304. The UI mechanism for creating such clusters is not shown in FIG. 3. In one embodiment, the UI mechanism comprises a button labeled "add a new cluster" that is displayed on top of or adjacent to canvas 202. Responsive to activation of this button by the user, UI manager 114 causes a new cluster representation to appear on canvas 202. However, various other UI mechanisms may be used to create clusters. In embodiments, cluster representations may be moved to different locations on the surface of canvas 202 in a like manner to data item representations using "drag-and-drop" functionality or like functionality.

In the embodiment associated with FIG. 3, each cluster is represented as a transparent circle or "bubble." A user creates an association between a data item and a cluster by placing a representation of the data item so that it overlaps with or is directly on top of a bubble. In response to this action, UI manager 114 causes the data item representation to appear within the bubble. For example, as shown in display screen 300, in response to user placement of a data item representation 312 over cluster representation 302, UI manager 114 has caused data item representation 312 to appear within cluster representation 302. Additionally, as shown in display screen 300, in response to user placement of a data item representation 314 over cluster representation 304, UI manager 114 has caused data item representation 314 to appear within cluster representation 304.

In further accordance with the embodiment associated with FIG. 3, UI manager 114 causes a counter to be displayed in association with each cluster representation that indicates the current number of data items associated with the cluster represented by the cluster representation. For example, as shown in display screen 300, a counter 306 associated with cluster representation 302 indicates that one data item is currently associated with the cluster represented by cluster representation 302. Additionally, as shown in display screen 300, a counter 308 associated with cluster representation 304 indicates that two data items are currently associated with the cluster represented by cluster representation 304.

UI manager 114 sends a notification to data manager 104 whenever a user has performed the steps necessary to create a cluster or to create an association between a data item and a cluster. Responsive to receiving a notification that a user has performed the steps necessary to create a cluster, data manager 104 creates a logical representation of the cluster in a cluster database 110. Responsive to receiving a notification that a user has performed the steps necessary to create an association between a data item and a cluster, data manager 104 creates a logical representation of the association in cluster database 110. For example, in one embodiment, data manager 104 stores a logical representation of each cluster created by a user and all the data items that the user has associated therewith in cluster database 110.

Data manager 104 is also configured to notify recommendation engine 106 whenever a user has created an association between a particular data item and a particular cluster. As will be described in more detail herein, recommendation engine 106 is configured to use such information to generate recommendations regarding additional data item-cluster associations that may be formed by the user. Such recommendations can then be obtained by the user via certain interactions with user interface 102. Such recommendations can be used by the user to assist in determining which data items should be associated with which clusters.

Figure 4:
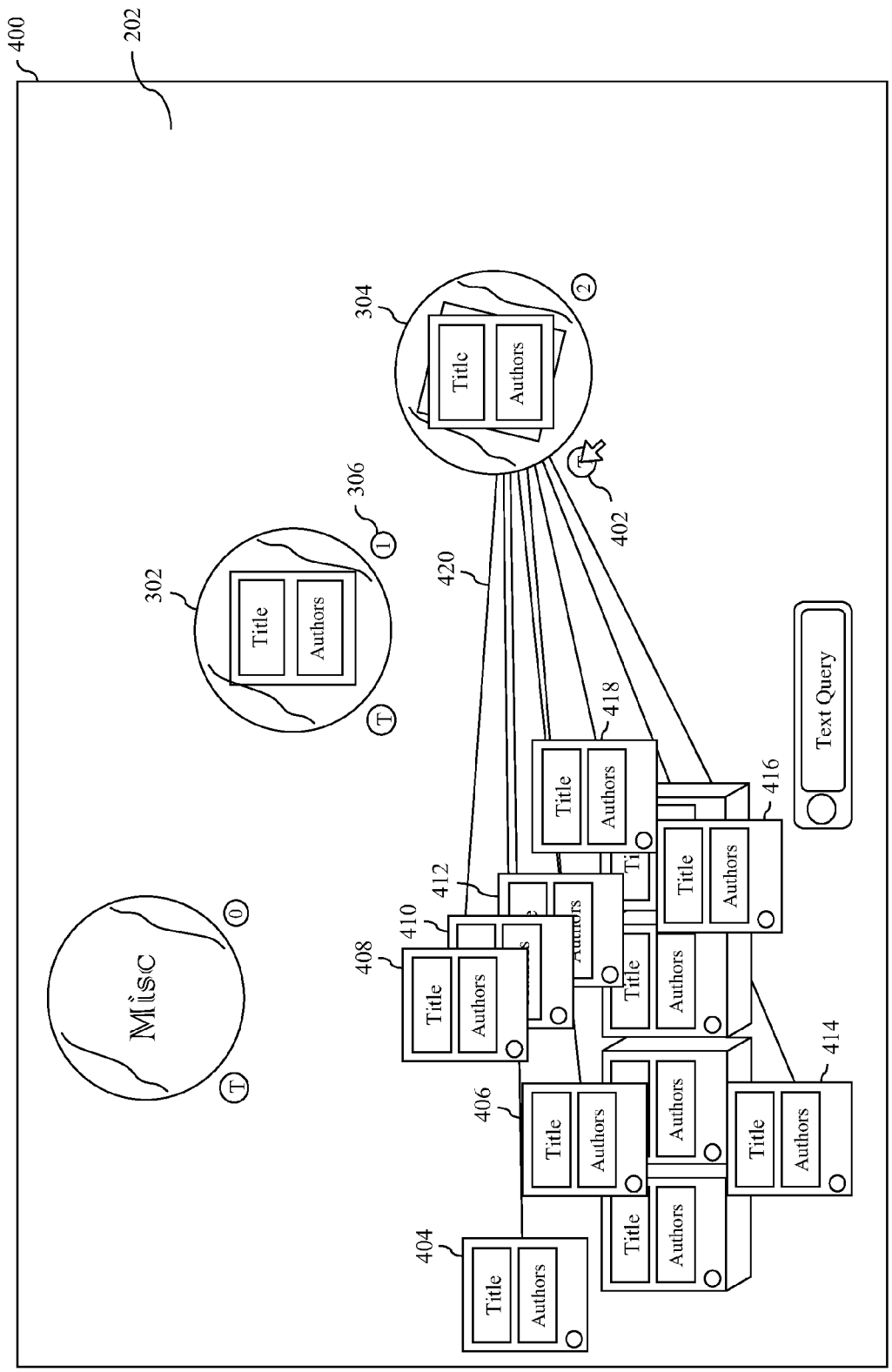

By way of example, FIG. 4 depicts a further display screen 400 that may be rendered to a display by UI manager 114 in accordance with an embodiment. Display screen 400 comprises a representation of canvas 202 after a user of system 100 has activated a button 402 associated with cluster representation 304. This action indicates to UI manager 114 that the user wishes to obtain recommendations regarding which, if any, unassociated data items should be associated with the cluster represented by cluster representation 304. Based on such an indication, UI manager 114 issues a request for such recommendations to data manager 104 and data manager 104 passes the request to recommendation engine 106. Any recommendations returned by recommendation engine 106 are then provided by data manager 104 to UI manager 114. UI manager 114 then displays the recommendations to the user.

For example, with respect to the embodiment associated with FIG. 4, UI manager 114 highlights the representations of unassociated data items that recommendation engine 106 has indicated should be included in the cluster represented by cluster representation 304. In example display screen 400, these data item representations include data item representations 404, 406, 408, 410, 412, 414, 416 and 418. UI manager 114 highlights these data item representations both by pulling the data item representations out of the stacks and by displaying a line that connects each data item representation to cluster representation 304. For example, as shown in FIG. 4, UI manager 114 has pulled data item representation 408 out of the stacks and rendered a line 420 connecting data item representation 408 to cluster representation 304. A user may then selectively determine whether or not to associate any of the data items having highlighted representations with the cluster represented by cluster representation 304. For example, the user may follow a recommendation by dragging and dropping a highlighted data item representation into cluster representation 304. Alternatively, the user may decide not to follow a recommendation and associate a data item having a highlighted representation with a different cluster or place the highlighted data item representation in a miscellaneous bubble (as will be discussed herein). In a further embodiment, responsive to a deactivation of button 402 by a user, UI manager 114 will cause all unassociated highlighted data item representations to be automatically returned to the stacks.

Figure 5:
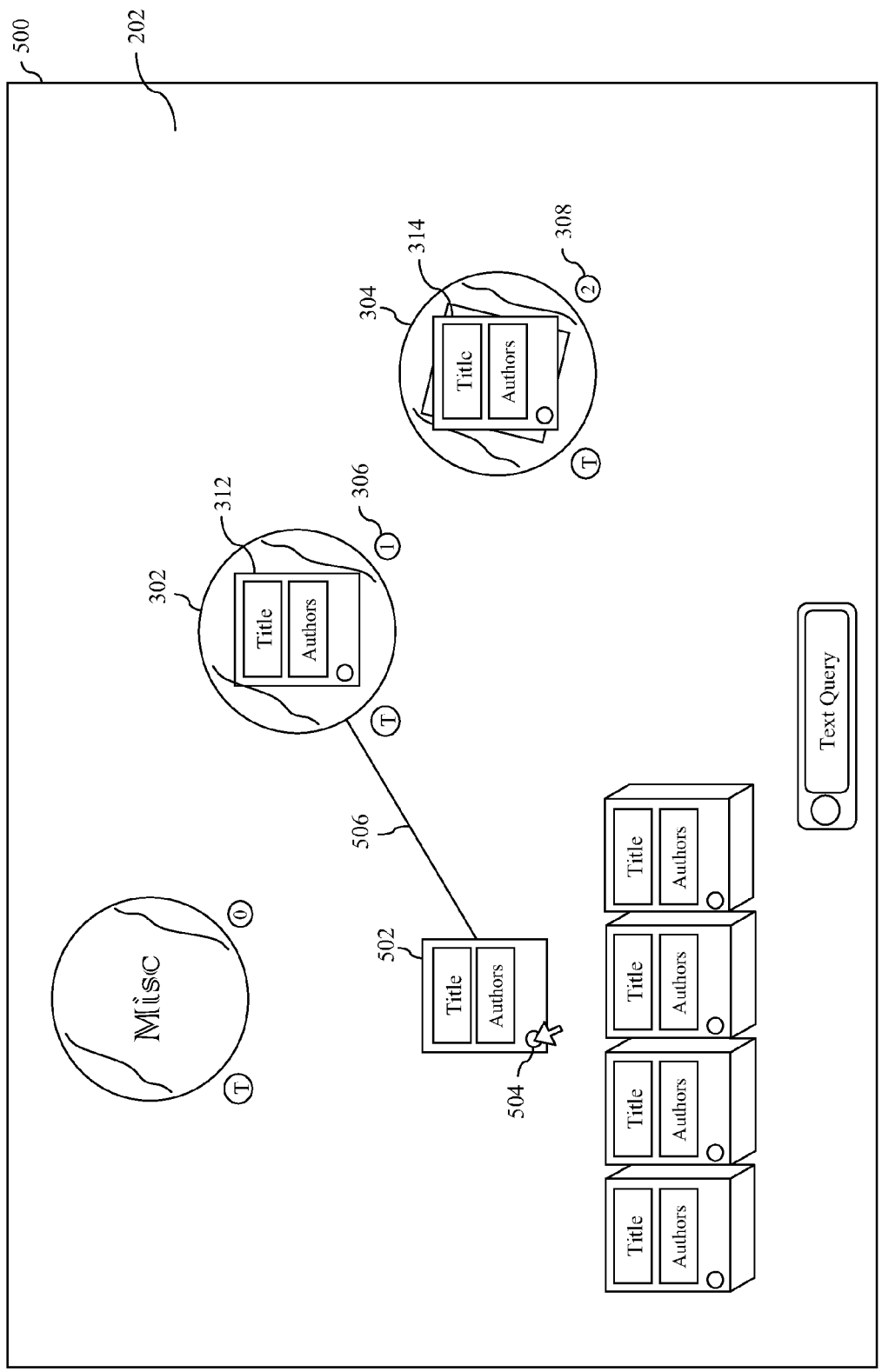

In addition to presenting recommendations regarding which unassociated data items should be associated with a user-selected cluster, system 100 is also capable of presenting recommendations regarding which cluster a user-selected data item should be associated with. By way of example, FIG. 5 depicts a further display screen 500 that may be rendered to a display by UI manager 114 in accordance with an embodiment. Display screen 500 comprises a representation of canvas 202 after a user of system 100 has activated a button 504 associated with a particular data item representation 502. This action indicates to UI manager 114 that the user wishes to obtain a recommendation regarding which cluster the corresponding data item should be associated with. Based on such an indication, UI manager 114 issues a request for such a recommendation to data manager 104 and data manager 104 passes the request to recommendation engine 106. Any recommendation returned by recommendation engine 106 is then provided by data manager 104 to UI manager 114. UI manager 114 then displays the recommendation to the user.

For example, with respect to the embodiment associated with FIG. 5, UI manager 114 highlights the representation of a cluster that recommendation engine 106 has identified as being a cluster with which the data item represented by data item representation 502 should be associated. In the example display screen 400, this cluster representation is cluster representation 302. UI manager 114 highlights cluster representation 302 by displaying a line 506 that connects data item representation 502 to cluster representation 302. A user may then selectively determine whether or not to associate the data item represented by data item representation 502 with the cluster representation by cluster representation 304. For example, the user may follow the recommendation by dragging and dropping data item representation 502 into cluster representation 302. Alternatively, a user may decide not to follow the recommendation by leaving data item representation 502 in an unassociated state on canvas 202, associating the data item represented by data item representation 502 with a different cluster, placing data item representation 502 in a miscellaneous bubble (as will be discussed herein) or by returning data item representation 502 to one of the stacks.

In addition to providing recommendations to a user regarding which data items should be associated with which clusters, system 100 may also provide search functionality that enables a user to locate data items that are relevant to a particular search query. Such functionality can be extremely helpful to a user when trying to cluster a large number of data items. For example, when the data items include textual elements, text searching can be useful to identify data items having similar textual content. Additionally, search functionality can be used to help a user identify a data item that the user has already reviewed but subsequently misplaced.

Figure 6:
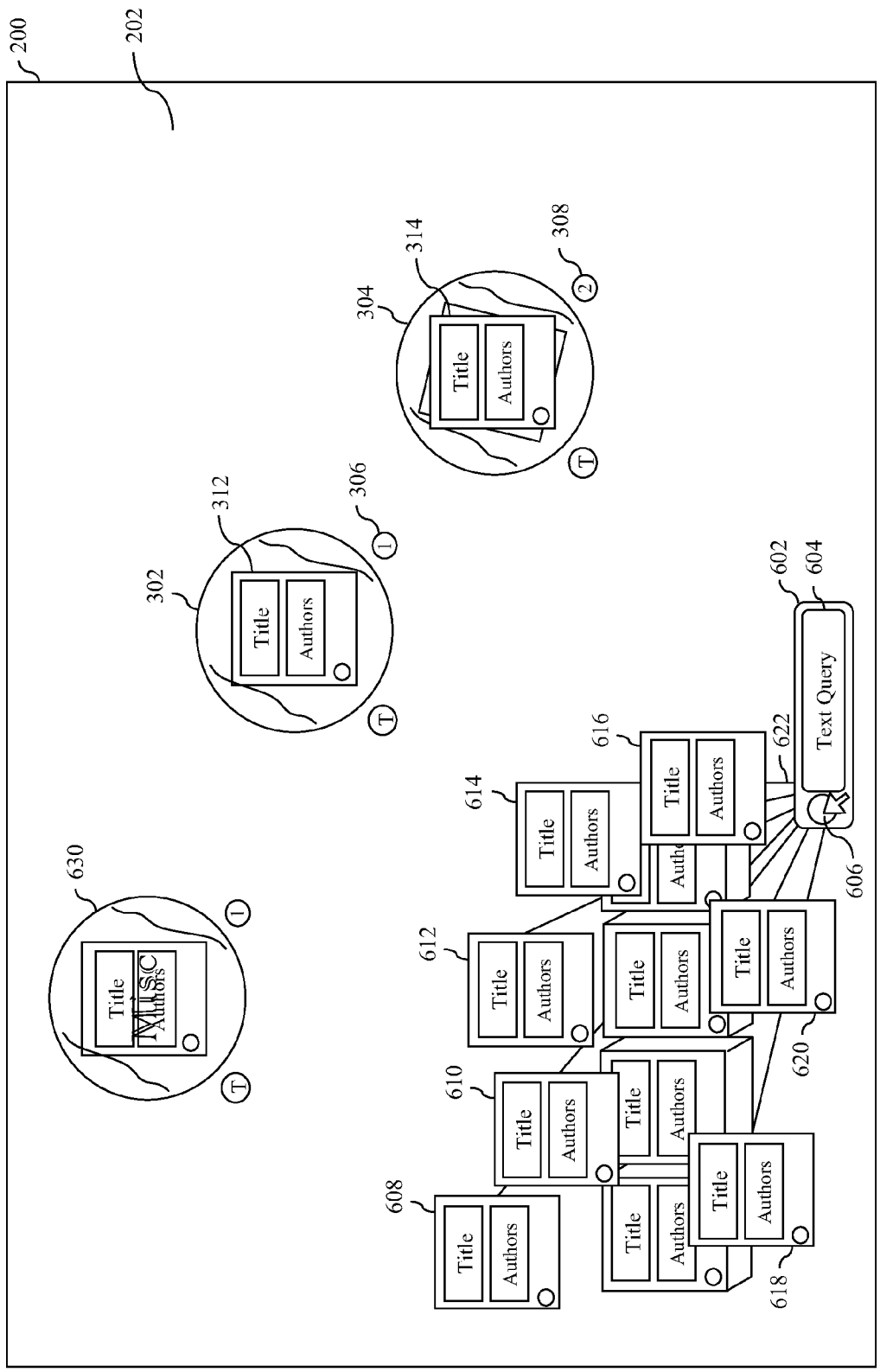

FIG. 6 depicts a further example display screen 600 that may be rendered to a display by UI manager 114 and that demonstrates the inclusion and use of such search functionality. As shown in FIG. 6, display screen 600 includes a search interface element 602 displayed on top of canvas 202. Search interface element 602 includes a text entry box 604 and a button 606. A user types a text query into text entry box 604 and then submits the text query by activating button 606. Responsive to activation of button 606, UI manager 114 passes the text query to data manager 104 and data manager 104 performs a search on the data items stored in database 108 based on the text query. Any of a wide variety of search algorithms may be used to execute the search. Data manager 104 then provides UI manager 104 with a list of data items that are deemed relevant to the text query and UI manager 104 highlights the representation of such data items. As shown in FIG. 6, the highlighted data item representations include data item representations 608, 610, 612, 614, 616, 618 and 620. UI manager 114 highlights these data item representations both by pulling the data item representations out of the stacks (and, in certain implementations, also out of the cluster representations) and by displaying a line that connects each data item representation to search interface element 602. For example, as shown in FIG. 6, UI manager 114 has rendered a line 622 connecting data item representation 616 to search interface element 602.

As can be seen from the foregoing, in one embodiment, the same or similar visual indicators are used for highlighting data items that should be placed in a user-selected cluster as are used for highlighting data items that are relevant to a user-submitted search query. The use of such a consistent approach to highlighting data items that may be of interest to a user is advantageous in that it allows a user to more quickly understand how to interact with user interface 102, thereby improving the user experience.

In order to help users maintain an orderly canvas, an embodiment also provides a "miscellaneous" cluster. An example representation 630 of such a miscellaneous cluster is shown in FIG. 6. A user may store representations of data items in the miscellaneous cluster when the user does not know or has not yet decided where else to place such representations and when the user does not wish to leave such representations strewn about canvas 202. Placing a data item representation in miscellaneous cluster representation 630 will not impact the quality of the recommendations produced by recommendation engine 106. That is to say, associations between data items and the miscellaneous cluster will not be considered by the algorithms used by recommendation engine 106 to generate recommendations. This enables a user to temporarily store any number of dissimilar data items within miscellaneous cluster representation 630.

The functionality of system 100 as described above advantageously allows information workers to perform clustering in a manner that is consistent with how those workers would normally perform such a task in the absence of machine-assistance: for example, it allows users to create new clusters, review data items and selectively move them into those clusters, open up clusters to examine their contents, and move clusters around.

Additionally, by providing recommendations to a user regarding which data items should be associated with which clusters, system 100 advantageously provides automated assistance to the user in performing a clustering task. Since such recommendations are based on prior data item-cluster associations created by the user, the recommendations can take into account user decisions regarding which data items should belong with which clusters (and implicitly, which data items should not belong with which clusters). The manner by which recommendation engine 106 learns from user clustering decisions to generate recommendations will be described in detail below.

It should be noted that the particular user interface described above in reference to the example display screens of FIGS. 2-6 has been described herein by way of example only and is not intended to be limiting. Many different variations of the foregoing example user interface may be utilized. For example, in accordance with certain embodiments, clusters may be automatically created based on user interactions with data item representations rather than through user interaction with an "add a new cluster" button or the like. For example, clusters may be created when a user places two or more data item representations near each other, or when a user stacks such data item representations on the canvas. Additionally, although clusters are represented in the foregoing example as bubbles that contain data item representations, in various alternate embodiments, other container-type representations, such as folders or the like, may be used. In still further embodiments, clusters may be represented as a particular arrangement of data item representations (e.g., as groups or stacks of data item representations) or by some other representation.

Additionally, in accordance with the foregoing example, a user creates a data item-cluster association by moving a data item representation so that it overlaps with or is on top of a cluster representation. However, such an association may be created in a wide variety of ways in accordance with alternate embodiments. For example, in accordance with various alternate embodiments, a user may associate a data item with a cluster by moving the representation of the data item closer to the representation of the cluster or vice versa, by drawing lines that connect data item representations to cluster representations, etc. Furthermore, a wide variety of indicators may be used to highlight recommended data items and clusters in addition to those set forth above. For example, in addition to pulling data item representations out of stacks and connecting data item representations to cluster representations using lines, an embodiment may reposition one or both of a data item representation and a cluster representation so that such representations are closer to each other or otherwise aligned in such a way as to show that an association between each is recommended.

In fact, entirely different user interface designs other than those described above may be used to implement user interface 102 of system 100 provided only that the user interface allows a user to associate data items with clusters and receive recommendations regarding which data items should be associated with which clusters. For example, user interface 102 may be implemented using audio or tactile output only or audio or tactile output in combination with visual output.

III. Example Recommendation Engine Implementation

As discussed above, recommendation engine 106 comprises a component that is configured to process information regarding data item-cluster associations made by a user to generate recommendations for the user regarding which unassociated data items should be associated with which clusters. Persons skilled in the relevant art(s) will appreciate that recommendation engine 106 can be implemented in a wide variety of ways to perform the foregoing functions.

In one embodiment, recommendation engine 106 is implemented using a machine learning system. The machine learning system is provided with training data in the form of user-created data item-cluster associations. The training data is used by the machine learning system to define an optimal clustering model, which is then used to generate user recommendations. In accordance with such an implementation, each new data item-cluster association created by a user provides additional training data that can be used to retrain the machine learning system to improve its performance.

A. Example Metric Learner Implementation

The machine learning system may comprise, for example, a metric learner that trains a distance measure. In accordance with such an embodiment, a formulation of the distance measure may be used that is based on "must-belong" and "cannot-belong" constraints derived from user-created data item-cluster associations.

Consider, for example, a series of candidate distance measures $d_k(x_i,x_j)$, which one wishes to combine with weights $\alpha_k$. The following combined distance function can then be written:

$$D(x_i, x_j) = \sum_k \alpha_k d_k(x_i, x_j)$$

In addition to the distance function, labels can be obtained from the user as to which data items must belong to which clusters, and thus that those data items cannot belong to the other clusters. For example, when a user associates a particular data item with a particular cluster, the user can be said to have specified that the particular data item must belong in the particular cluster and likewise that the particular data item cannot belong to any other cluster.

The distance between a data item and a cluster can be expressed as the distance from the data item to the centroid of the cluster, $c_j$, which represents the data item that has the minimum cumulative distance to all other data items in the cluster. To achieve satisfactory clustering, it is desirable to minimize the distance between data items and the clusters they belong to, and maximize the distance to other clusters. This leads to the following cost function which is sought to be minimized:

$$C = \frac{1}{I_m}\sum_{\substack{i \in must \\ belong}}^{l_m} D(x_i, c_j) - \frac{1}{I_c}\sum_{\substack{i \in can't \\ belong}}^{l_c} D(x_i, c_j) + \gamma \sum_k \alpha_k^2$$

It is noted that each type of constraint is normalized by the number of such constraints ($I_m$ and $I_c$), as there are typically many more cannot-belong constraints. It is also noted that the final element is a regularization term, which controls the growth of the $\alpha_k$; in certain embodiments, $\gamma$ is set to 1.

To minimize the foregoing cost function C, the derivative is taken with respect to the weights:

$$\frac{dC}{d\alpha_k} = \frac{1}{I_m}\sum_{\substack{i \in must \\ belong}}^{l_m} d_k(x_i, c_j) - \frac{1}{I_c}\sum_{\substack{i \in can't \\ belong}}^{l_c} d_k(x_i, c_j) + 2\gamma\alpha_k$$

The $\alpha_k$ are further constrained to be positive by representing them as $\beta_k^2$; optimizations are then performed in terms of the $\beta$ variables via the chain rule:

$$\frac{dC}{d\beta_k} = \frac{dC}{d\alpha_k}\frac{d\alpha_k}{d\beta_k} = \frac{dC}{d\alpha_k}2\beta_k$$

Given these derivatives and the convexity of the formulation, the limited memory Broyden-Fletcher-Goldfard-Shanno (L-BFGS) method is used to find the optimal $\beta_k$, which is then squared to find the $\alpha_k$ for the overall $D(x_i,x_j)$. Note that this optimization must be performed every time a data item is added or removed from any cluster. This distance function can then be used to find the closest items to a cluster.

In order to apply the method, it is also necessary to define some component distances $d_k(x_i,x_j)$. By way of example, in an implementation in which each data item comprises an academic paper, the distance measures may be based on the title, author and abstract of each academic paper. For example, in accordance with one such embodiment, the title, author and abstract of each paper may first be converted into a vector term frequency-inverse document frequency (TFIDF) representation, a common approach for information retrieval tasks. Six distance measures may then be computed: the $l_2$ and $l_2$ vector norms between the TFIDF representations of the titles, the authors, and the abstracts of documents $x_i$ and $x_j$.

Although a particular metric learner example is described above, persons skilled in the relevant art will readily appreciate that many possible variations may be introduced thereto. For example, instead of the distance to the centroid of the cluster, the minimum, maximum, or mean distance could be used. Additionally, instead of a single set of weights for each component function in the global distance function, a separate set of weights could be used within each function to weight the relative contribution from each feature (i.e., instead of using the TFIDF weights). Still further, a host of other possible component distant functions could have been utilized. In view of this, persons skilled in the relevant art(s) will readily appreciate that recommendation engine 106 may be implemented using metric learner designs other than those specifically described herein.

B. Example Classifier Implementation

In an alternate embodiment, the machine learning system is implemented using a classifier rather than a metric learner. One example of such an implementation will now be described.

Since a user of system 100 places data items into distinct categories, positive and negative labels can be obtained for each cluster. A classifier can thus be trained for each cluster that determines which data items in the stacks of unassociated data items may belong to it. Furthermore, for many classifiers, not only can a binary answer be computed but also a score value for how well the data item fits. In accordance with one embodiment, logistic regression is used both because of its interpretability, as it learns a weight for each feature $f_1$ and also for its meaningful output score, i.e., the probability that the given example's label $y_i$ is 1:

$$f_c(x_i) = P(y_i = 1) = \frac{1}{1 + e^{-\sum w_j f_{ij} + \delta}}$$

The parameters $w_j$ and the bias $\delta$ are found by minimizing the total log likelihood of the labeled data under this model, weighting the positive and negative examples so they have equal importance to the cost function; an $l_1$-regularization term is also added to encourage sparsity in the solution. As the formulation is convex, the optimal solution is found using L-BFGS.

In this case, instead of distance measures, a set of features must be supplied to the learner. With continued reference to the example implementation in which each data item comprises an academic paper, one can begin with a TFIDF vector representation of the combined title, author list, and abstract, which may be of a large number of dimensions and quite sparse. This would result in having to learn a large number of parameters $w_i$, which can lead to very poor performance in some systems, even with the $l_1$ regularizer. To address this issue, the dimensionality may be reduced using principal component analysis (PCA) and the raw vector may be projected onto the top 100 eigenvectors (i.e., corresponding to the 100 highest eigenvalues); this is typically referred to as latent semantic indexing or an LSI representation in the information retrieval literature. Finally, once the classifier has been trained, a set of recommendations can be produced from this method by computing $f(x_i)$ for each unassociated data item and then sorting by the score value.

Although a particular classifier example is described above, persons skilled in the relevant art will readily appreciate that many possible variations may be introduced thereto. For example, there are other choices of models or features that could be used to improve performance. In view of this, persons skilled in the relevant art(s) will readily appreciate that recommendation engine 106 may be implemented using classifier designs other than those specifically described herein.

C. Combined Metric Learner and Classifier Implementation

In a further embodiment, the machine learning system is implemented as a combination of a metric learner and a classifier. Before describing a specific approach for combining these two different types of learners, it may be useful to consider why this might be a good idea. The two methods are learning quite different things: the metric learner is learning a global distance function between data items, while the classifier is seeking a discriminating surface between data items inside and outside a given cluster. Furthermore, when a user adds a new data item to a cluster, it provides the same benefit to all clusters in the metric learner, but helps the particular classifier for that cluster more than the others. In a similar vein, if 50 data items have been put into clusters when a new cluster is created with a single data item, the metric learner will likely have converged to a set of weights, while the classifier must discriminate based on only one positive example. It is reasonable, then, to expect that one or the other method might perform better in different situations. It would be beneficial if the machine learner could always perform as well as the best performing algorithm, or ideally even better. To help achieve this, a hybrid mechanism may be used that combines the recommendations from each approach. Such an approach will be described below.

While a metric learner cannot be turned into a classifier without assigning a threshold to its recommendations, the results of an individual classifier can be turned into a distance function that will only affect one cluster by careful assignment of its values. Specifically for cluster c:

$$d_c(x_i, x_j) = \begin{cases} s(1 - f(x_i)), & x_j \text{ in } c \\ 0, & \text{otherwise} \end{cases}$$

In other words, if the classifier thinks the item is in c, i.e., $f(x_i)$ is close to 1, the distance is small; otherwise it is large; if c is not involved, it contributes nothing. This unusual, asymmetric formulation has the advantage that only the columns corresponding to a particular cluster (and thus a particular classifier) are affected. As a result, though the weight for $d_c$ will be learned globally for all items, it will only affect the cluster c. The scaling function s accounts for the fact that the outputs of logistic regression hover around 0.5 when the classifier has not seen many examples. Its form is as follows:

$$s(z) = \zeta(z - 0.5) + C$$

The values for $C$ and $\zeta$ are set after all elements of $d_c$ are computed, and the values of $d_c$ are normalized to be between 0 and 10 to be commensurate with the other kernels.

Figure 7:
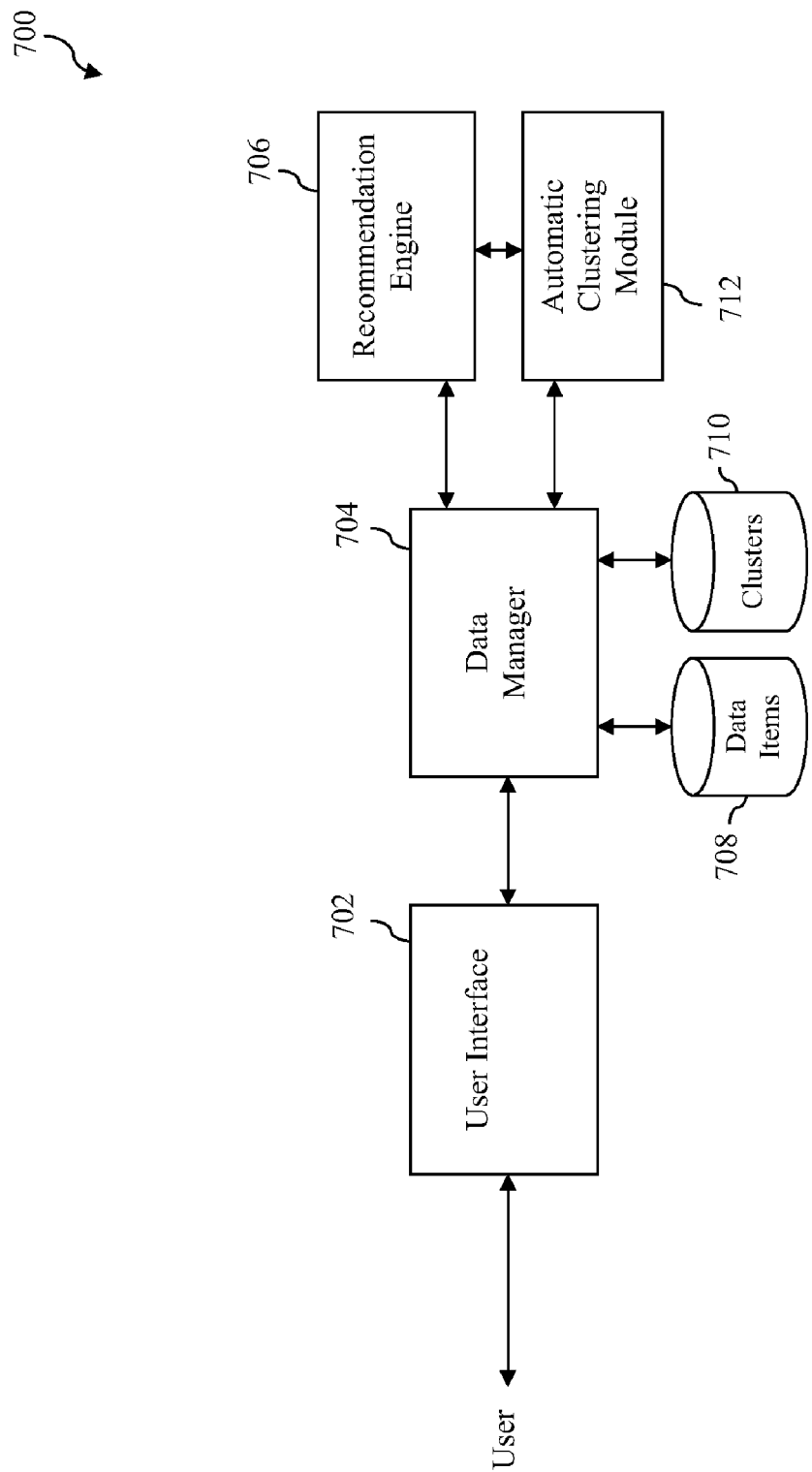
FIG. 7 is a block diagram of an example assisted clustering system in accordance with an embodiment that provides automatic clustering functionality.

IV. Example Assisted Clustering System with Automatic Clustering Functionality FIG. 7 is a block diagram of an example assisted clustering system 700 in accordance with an alternate embodiment that provides automatic clustering functionality. As shown in FIG. 7, assisted clustering system 700 includes a user interface 702, a data manager 704, a recommendation engine 706 and an automatic clustering module 712.

User interface 702, data manager 704 and recommendation engine 706 are configured to operate in a like fashion to user interface 102, data manager 104 and recommendation engine 106 as described above in reference to FIG. 1. Accordingly, these components allow a user to create clusters and selectively associate data items therewith. The data items to be clustered are stored in data items database 708, while clusters and associations between such clusters and data items are tracked in cluster database 710. Additionally, these components operate in a similar manner to like-named components of system 100 to generate recommendations regarding which unassociated data items should be associated with which clusters and to present such recommendations to a user.

As shown in FIG. 7, system 700 further includes an automatic clustering module 712. Automatic clustering module 712 is configured to use a clustering model generated by recommendation engine 706 to automatically cluster all unassociated data items in database 708. Various methods by which recommendation engine 706 can be trained to generate such a clustering model were previously described.

In system 700, the functionality of automatic clustering module 712 can be invoked by a user via interaction with user interface 702. For example, in an embodiment in which user interface 702 comprises a GUI, user interface 702 may cause a button or other visual element that can be activated by a user to invoke the functionality of automatic clustering module 712. Still other UI mechanisms may be used.

System 700 as described above advantageously allows a user to initiate a fully-automated clustering process at a point in time where the user has determined that the clustering model generated by recommendation engine 706 is performing at a satisfactory level. For example, it is anticipated that in certain embodiments, when a user first begins the clustering task and has seeded only a few clusters with a few data items, that the limited amount of training data will result in recommendation engine 706 producing recommendations of relatively poor quality. However, as the user creates more and more data item-cluster associations, the increased volume of training data will enable recommendation engine 706 to obtain an increasingly sophisticated and accurate clustering model. At some point, the user may become sufficiently satisfied with the quality of the recommendations being produced by recommendation engine 706 that the user will feel that he/she no longer needs to operate user interface 702 to create data item-cluster associations and instead can allow the model to be applied to cluster all remaining unassociated data items. In this case, the user can invoke automatic clustering module 712 via user interface 702 to automatically perform this function. This feature is particularly helpful where the number of data items to be clustered is quite large and thus not amenable to clustering via user-created associations only.

Figure 8:
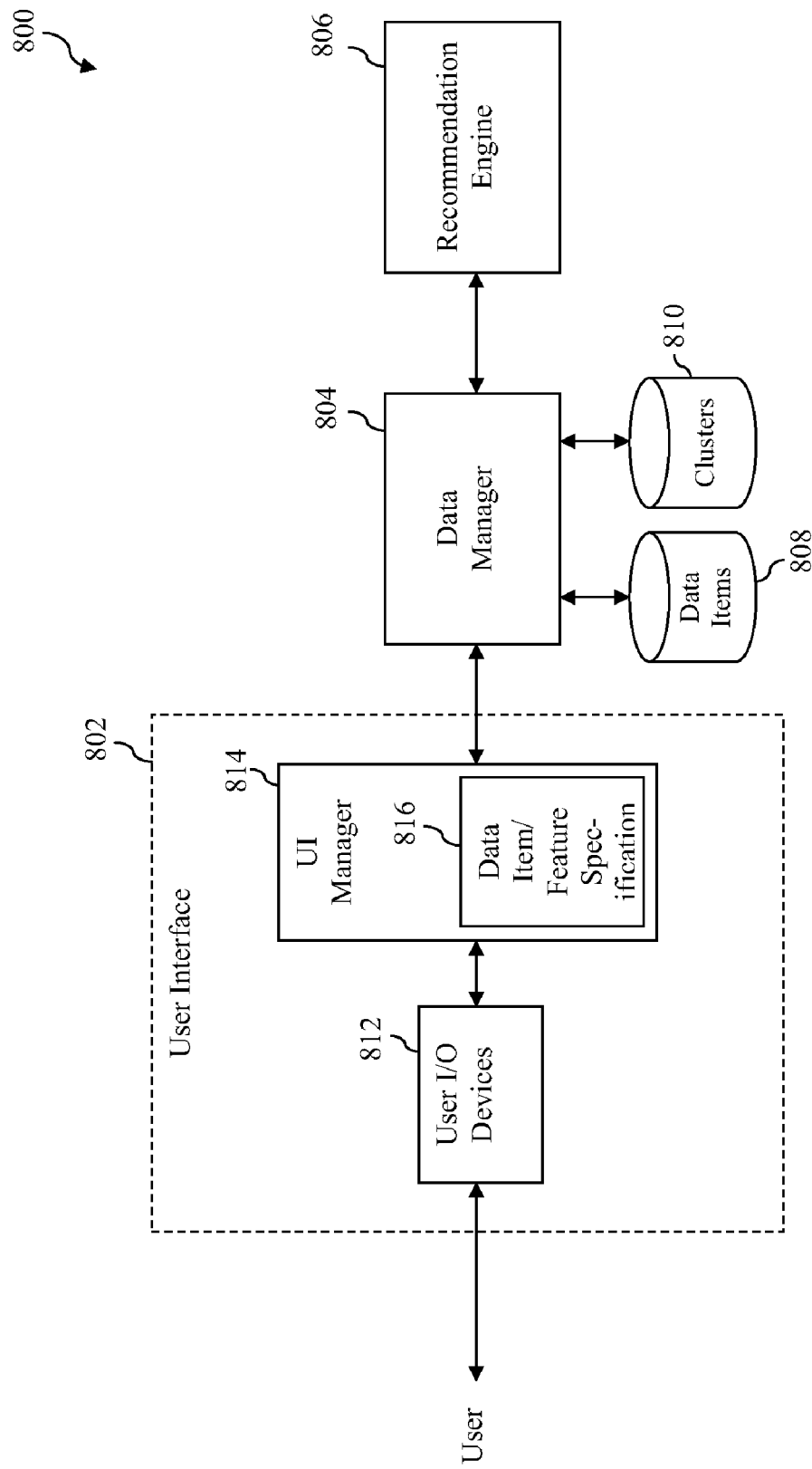
FIG. 8 is a block diagram of an example assisted clustering system in accordance with an embodiment that supports user-specified data item types and features.

V. Example Assisted Clustering System that Supports User-Specified Data Item Types and Features FIG. 8 is a block diagram of an example assisted clustering system 800 in accordance with an alternate embodiment that that supports user specification of data item types and features. As shown in FIG. 8, assisted clustering system 800 includes a user interface 802, a data manager 804 and a recommendation engine 806. User interface 802 includes user I/O devices 812 and a UI manager 814.

User interface 802, data manager 804 and recommendation engine 806 are configured to operate in a like fashion to user interface 102, data manager 104 and recommendation engine 106 as described above in reference to FIG. 1. Accordingly, these components allow a user to create clusters and selectively associate data items therewith. The data items to be clustered are stored in data items database 808, while clusters and associations between such clusters and data items are tracked in cluster database 810. Additionally, these components operate in a similar manner to like-named components of system 100 to generate recommendations regarding which unassociated data items should be associated with which clusters and to present such recommendations to a user.

As further shown in FIG. 8, UI manager 814 includes a data item/feature specification module 816. Data item/feature specification module 816 enables a user to interact with user interface 802 to specify one of a variety of types of data items to be clustered using system 800. Data item/feature specification module 816 also enables a user to identify features associated with such data items that should be considered by recommendation engine 106 when generating a clustering model.

An embodiment can advantageously be used to cluster data items of arbitrary data types, provided only that such data items present features that can be used to discern a clustering model for generating recommendations. For example, and without limitation, an embodiment can be used to cluster any type of textual documents or records (including structured and unstructured text), images, video files, audio files, or composite documents such as Web pages that include text, images, audio content, video content, and/or links. Items may represent for example and without limitation, resumes, blog posts, job descriptions, stock profiles, or other types of data and/or content.

In accordance with the embodiment shown in FIG. 8, a user can specify which type of data item will be clustered via interaction with user interface 802 as managed by data item/feature specification module 816. This module may also allow a user to specify a method or means by which data manager 804 can access such data items. For example, depending upon the implementation, the data items can be loaded into a local storage system or device that is accessible by data manager 804 or can be retrieved in bulk or as needed from a remotely-located entity via a network or other communication medium.

Recommendation engine 806 may be configured to operate differently depending on which type of data item is specified by the user. For example, recommendation engine 806 may implement a different machine learning algorithm for each type of data item that can be handled by system 800.

As noted above, data item/feature specification module 816 also enables a user to identify features associated with data items that should be considered by recommendation engine 106 when generating a clustering model. For example, the user can identify certain sections or fields associated with a collection of text documents or records that should be considered by recommendation engine 106 when generating a clustering model. The identified features may be used by recommendation engine 106, for example, for calculating a distance metric to be used by a metric learner. As another example, the identified features may be used by recommendation engine 106 to implement a classifier. The identified features may be used in other ways as well. This aspect of system 800 advantageously enables a user to educate recommendation engine 106 as to which aspects of the data items to be clustered should be considered important in determining whether data items should belong in the same or different clusters. Similarly, this aspect of system 800 advantageously enables a user to educate recommendation engine 106 as to which aspects of the data items to be clustered should be ignored.

VI. Example Assisted/Automatic Clustering Methods

Figure 9:
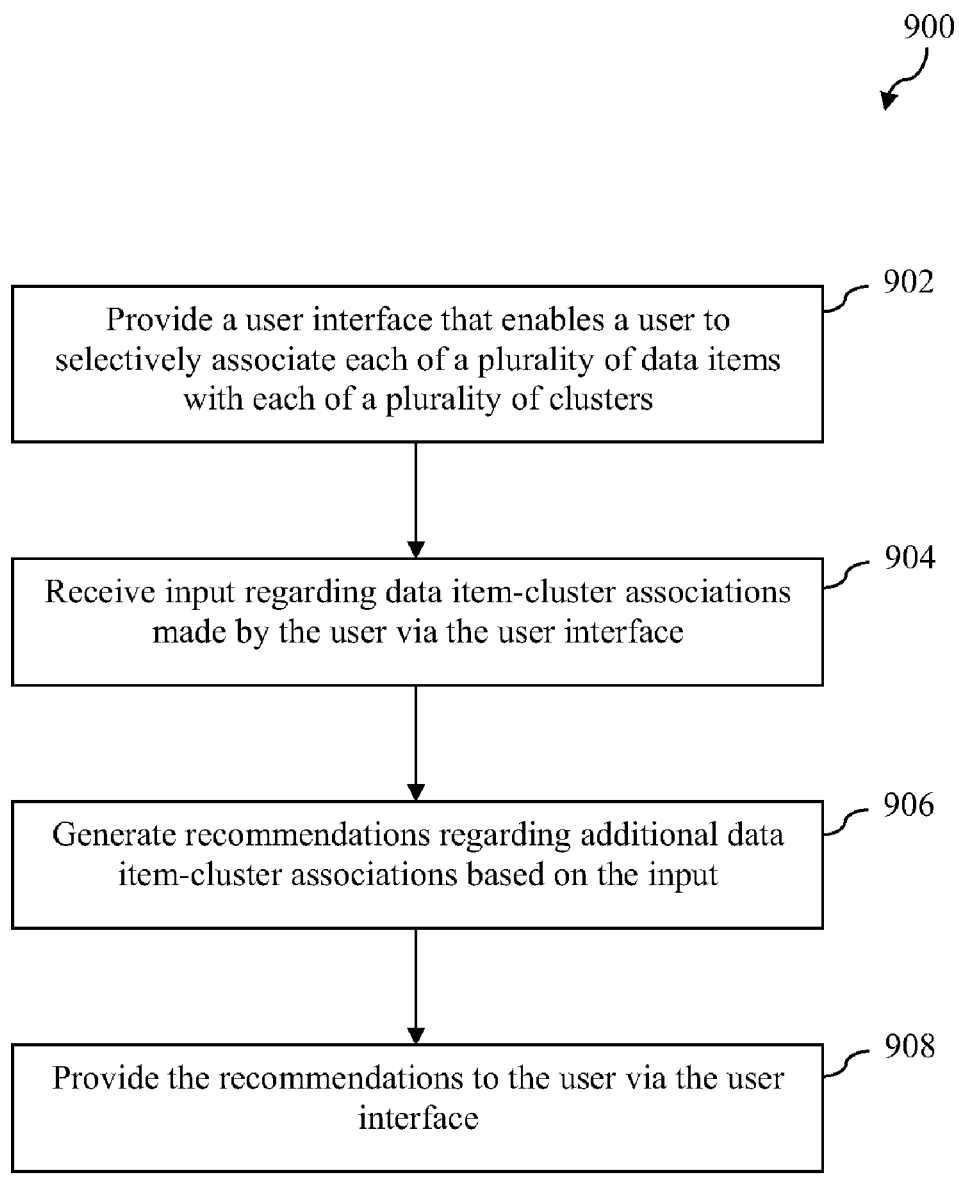
FIG. 9 depicts a flowchart of a method for performing assisted clustering in accordance with an embodiment.

Example methods for performing assisted and/or automatic clustering in accordance with various embodiments will now be described. In particular, FIG. 9 depicts a flowchart 900 of an example method for performing assisted clustering in accordance with an embodiment. The method of flowchart 900 will now be described with continued reference to systems 100, 700 or 800 as described above in reference to FIGS. 1, 7 and 8, respectively. However, persons skilled in the relevant art(s) will appreciate that the method of flowchart 900 is not limited to those implementations.

As shown in FIG. 9, the method of flowchart 900 begins at step 902 in which a user interface is provided that enables a user to selectively associate each of a plurality of data items with each of a plurality of clusters. This step may be performed for example by any of user interface 102 of system 100, user interface 702 of system 700 or user interface 802 of system 800. As discussed above in reference to system 800, user interface 802 may also enable a user to specify data items of arbitrary data types for selective association with clusters and/or enable a user to specify features associated with the data items that should be used to develop a clustering model.

At step 904, input regarding data item-cluster associations made by the user via the user interface is received. This step may be performed, for example, by data manager 104/recommendation engine 106 of system 100, data manager 704/recommendation engine 706 of system 700, or data manager 804/recommendation engine 806 of system 800. As discussed above in reference to these embodiments, input regarding data item-cluster associations made by the user is received by a data manager that tracks such associations as well as by a recommendation engine that uses such input to generate recommendations.

At step 906, recommendations regarding additional data item-cluster associations that may be made by the user are generated based on the input received during step 904. This step may be performed, for example, by recommendation engine 106 of system 100, recommendation engine 706 of system 700 or recommendation engine 806 of system 800. Generating such recommendations may comprise for example generating at least one recommendation regarding which data item(s) to associate with a user-selected cluster. Generating such recommendations may also comprise for example generating at least one recommendation regarding which cluster to associate a user-selected data item with. As previously discussed, in certain embodiments, the recommendation engine comprises a machine learning system that is trained to generate the recommendations based on the input. Such a machine learning system may comprise, for example and without limitation, a metric learner, a classifier, a hybrid metric learner and classifier, or a clustering algorithm.

At step 908, the recommendations generated during step 906, or at least a portion thereof, are presented to the user via the user interface. This step may be performed for example by any of user interface 102 of system 100, user interface 702 of system 700 or user interface 802 of system 800. As discussed above, this step may include, for example, outputting a user-perceivable indication that a particular data item representation should be associated with a particular cluster representation. The user-perceivable indication may comprise, for example, a visual indication, an audible indication, a tactile indication, or the like. In an embodiment, in which the user-perceivable indication comprises a visual indication, the visual indication may comprise any of the types of indication shown in the example display screens of FIGS. 4 and 5 (e.g., repositioning the data item representations by pulling them out of stacks and connecting such representations to cluster representations via lines) or other types of visual indications.

Figure 10:
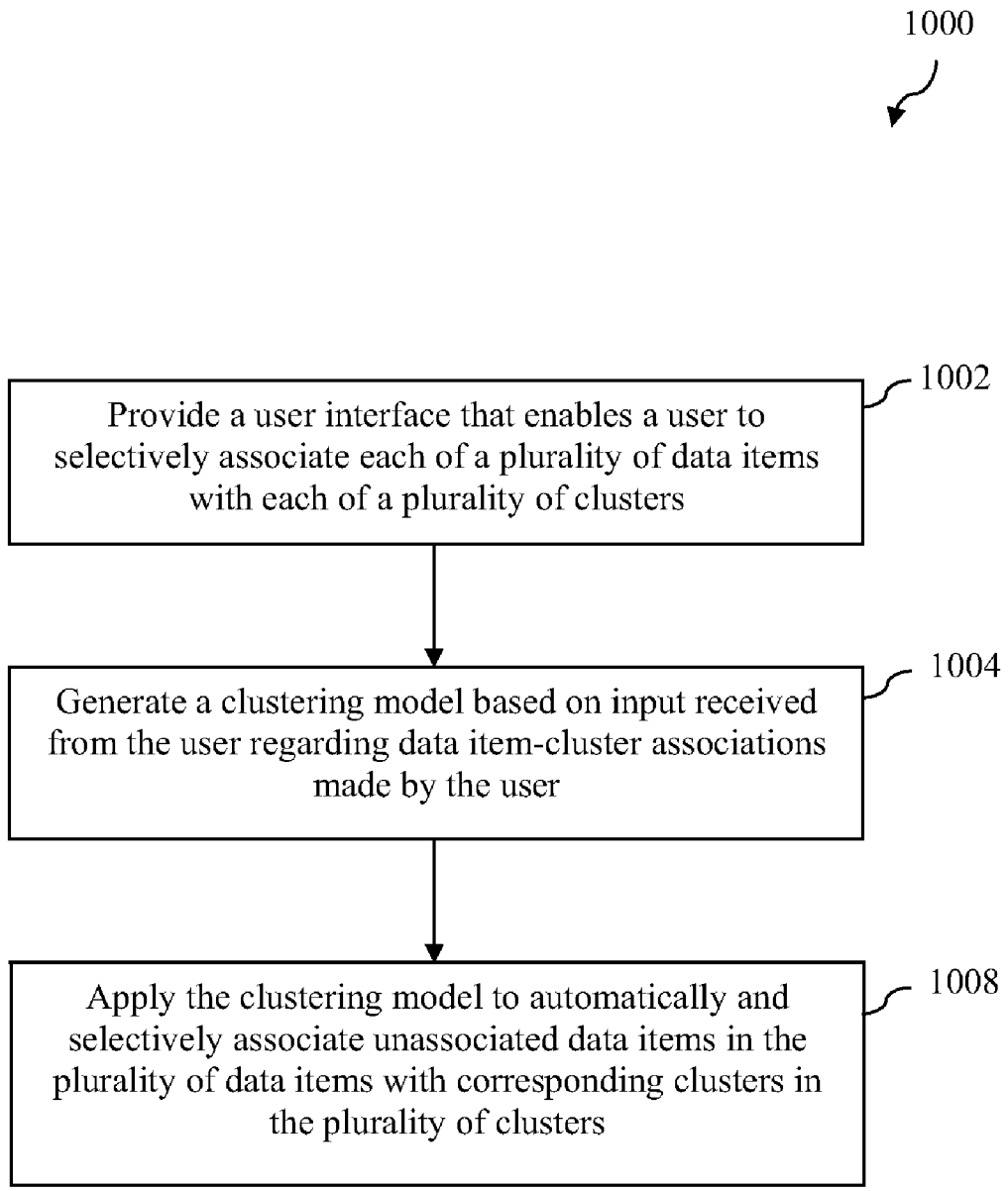
FIG. 10 depicts a flowchart of a method for performing automatic clustering in accordance with an embodiment.

FIG. 10 depicts a flowchart 1000 of an example method for performing automatic clustering in accordance with an embodiment. The method of flowchart 1000 will now be described with continued reference to system 700 as described above in reference to FIG. 7. However, persons skilled in the relevant art(s) will appreciate that the method of flowchart 1000 is not limited to that implementation.

As shown in FIG. 10, the method of flowchart 100 begins at step 1002 in which a user interface is provided that enables a user to selectively associate each of a plurality of data items with each of a plurality of clusters. This step may be performed for example by user interface 702 of system 700.

At step 1004, a clustering model is generated based on input received from the user regarding data item-cluster associations. This step may be performed for example by recommendation engine 706 of system 700. As previously discussed, in certain embodiments, the recommendation engine may comprise a machine learning system that is trained to learn a clustering model based on the input received from the user regarding data item-cluster associations. Such a machine learning system may comprise, for example and without limitation, a metric learner, a classifier, a hybrid metric learner and classifier, or a clustering algorithm.

At step 1006, the clustering model generated during step 1004 is applied to automatically and selectively associate unassociated data items in the plurality of data items with corresponding clusters in the plurality of clusters. This step may be performed for example by automatic clustering module 716 of system 700 in response to user input received via user interface 702. As discussed above in reference to that embodiment, a user may initiate such a fully-automated clustering process at a point in time where the user has determined that the clustering model generated by recommendation engine 706 is performing at a satisfactory level.

VII. Example Computer System Implementations

Figure 11:
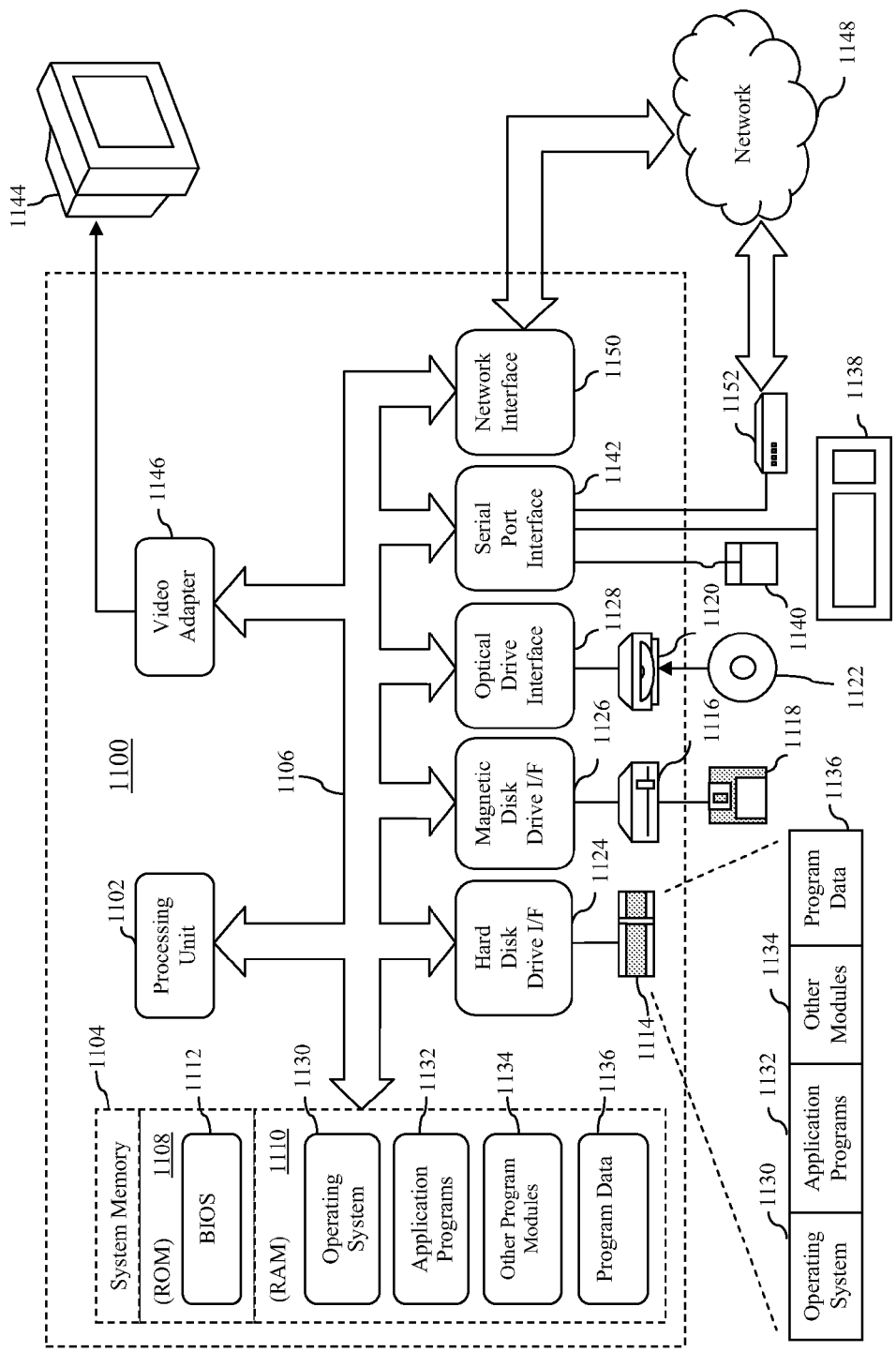
FIG. 11 is a block diagram of an example computer system that may be used to implement an assisted clustering system in accordance with an embodiment.

FIG. 11 depicts an example computer system 1100 that may be used to implement an assisted clustering system in accordance with an embodiment. For example, any of assisted clustering system 100 of FIG. 1, assisted clustering system 700 of FIG. 7 or assisted clustering system 800 of FIG. 8 may be implemented using computer system 1100. Computer system 1100 may represent a general-purpose computing device in the form of a conventional personal computer, a mobile computer, or a workstation, for example, or computer system 1100 may be a special purpose computing device. The description of computer system 1100 provided herein is provided for purposes of illustration, and is not intended to be limiting. Embodiments may be implemented in further types of computer systems, as would be known to persons skilled in the relevant art(s).

As shown in FIG. 11, computer system 1100 includes a processing unit 1102, a system memory 1104, and a bus 1106 that couples various system components including system memory 1104 to processing unit 1102. Processing unit 1102 may comprise one or more processors or processing cores. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random access memory (RAM) 1110. A basic input/output system 1112 (BIOS) is stored in ROM 1108.

Computer system 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1130, one or more application programs 1132, other program modules 1134, and program data 1136. Application programs 1132 or program modules 1134 may include, for example, logic for implementing UI manager 114, data manager 104 and recommendation engine 106 of system 100, logic for user interface 702, data manager 704, recommendation engine 706 and automatic clustering module 716 of system 700, and/or logic for implementing UI manager 814, data manager 804 and recommendation engine 806 of system 800. Thus, when executed, these application programs 1132 or program modules 1134 can perform functions and features described above, including but not limited to methods such as those described above in reference to flowchart 900 of FIG. 9 and flowchart 1000 of FIG. 10.

A user may enter commands and information into the computer system 1100 through input devices such as keyboard 1138 and pointing device 1140. Other input devices (not shown) may include a microphone, joystick, game controller, scanner, or the like. In one embodiment, a multi-touch capable touch screen is provided in conjunction with a display 1144 to allow a user to provide user input via the application of a touch (as by a finger or stylus for example) to one or more points on the touch screen. These and other input devices are often connected to processing unit 1102 through a serial port interface 1142 that is coupled to bus 1106, but may be connected by other interfaces, such as a parallel port, game port, or a universal serial bus (USB). These input devices may comprise part of user I/O devices 112, user interface 702, and/or user I/O devices 812 as described above in reference to systems 100, 700 and 800, respectively.

A display 1144 is also connected to bus 1106 via an interface, such as a video adapter 1146. In addition to the display, computer system 1100 may include other peripheral output devices (not shown) such as speakers and printers. These output devices may comprise part of user I/O devices 112, user interface 702, and/or user I/O devices 812 as described above in reference to systems 100, 700 and 800, respectively.

Computer system 1100 is connected to a network 1148 (e.g., a local area network or wide area network such as the Internet) through a network interface or adapter 1150, a modem 1152, or other means for establishing communications over the network. Modem 1152, which may be internal or external, is connected to bus 1106 via serial port interface 1142.

As used herein, the terms "computer program medium" and "computer-readable medium" are used to generally refer to non-transitory media such as the hard disk associated with hard disk drive 1114, removable magnetic disk 1118, removable optical disk 1122, as well as other media such as flash memory cards, digital video disks, random access memories (RAMs), read only memories (ROM), and the like.

As noted above, computer programs and modules (including application programs 1132 and other program modules 1134) may be stored on the hard disk, magnetic disk, optical disk, ROM, or RAM. Such computer programs may also be received via network interface 1150 or serial port interface 1142. Such computer programs, when executed or loaded by an application, enable computer 1100 to implement features of embodiments discussed herein. Accordingly, such computer programs represent controllers of computer system 1100.

Embodiments are also directed to computer program products comprising software stored on any computer-readable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

Instead of being implemented as a standalone processor-based computer system or device, an assisted clustering system in accordance with an alternate embodiment may be implemented using a networked arrangement of such systems or devices. FIG. 12 depicts a system 1200 that implements assisted clustering using such a network-based approach. As shown in FIG. 12, the functions of the user interface as described herein may be implemented on each of a plurality of client systems or devices, resulting in a plurality of user interfaces $1202_1$-$1202_N$, each of which may be used by a respective user among a plurality of users 1-N. In contrast, single data manager 1204 and recommendation engine 1206 are implemented by a centralized network entity such as a server which communicates with user interface $1202_1$-$1202_N$ via a network 1212. Data manager 1204 provides central tracking of all data items, clusters and data item-cluster associations created by users 1-N in databases 1208 and 1210 while recommendation engine 1206 generates recommendations based on user input received from all users 1-N. This arrangement of system 1200 advantageously permits a plurality of users to collaboratively perform a clustering task, with system 1200 providing helpful recommendations based on input received from all users. Other arrangements for implementing such an assisted clustering system may be used.

VIII. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. An assisted clustering system, comprising:
    a user interface that enables a user to selectively associate each of a plurality of data items with any one of a plurality of clusters; and
    a computer-implemented recommendation engine that receives input regarding data item-cluster associations made by the user via the user interface and that generates recommendations for provision to the user regarding additional data item-cluster associations based on the input.

2. The system of claim 1, wherein the recommendations comprise at least one recommendation regarding which data item(s) to associate with a user-selected cluster.

3. The system of claim 1, wherein the recommendations comprise at least one recommendation regarding which cluster to associate a user-selected data item with.

4. The system of claim 1, wherein the user interface enables a user to specify data items of arbitrary data types for selective association with clusters.

5. The system of claim 1, wherein the recommendation engine comprises a machine learning system that that is trained to generate the recommendations based on the input.

6. The system of claim 5, wherein the machine learning system comprises one of a metric learner, a classifier, a hybrid metric learner and classifier, or a clustering algorithm.

7. The system of claim 5, wherein the user interface enables a user to specify features associated with the data items that are to be used by the machine learning system to build a model for generating the recommendations.

8. The system of claim 1, further comprising a computer-implemented cluster manager that maintains a record of user-created associations between data items and clusters.

9. A system comprising a processing unit, one or more input devices, and a display, the processing unit being configured to implement a graphical user interface by processing user input provided via the input device(s) and by rendering images to the display, the graphical user interface enabling a user to associate each of a plurality of data items with any one of a plurality of clusters in a system-assisted manner and comprising:

a visual representation of each of the data items;

a visual representation of each of the clusters;

means for enabling the user to selectively associate each data item representation with any one of the cluster representations; and means for outputting a user-perceivable indication that a particular data item representation should be associated with a particular cluster representation based on a system-generated recommendation.

10. The system of claim 9, wherein each cluster representation is selectable by the user and wherein the means for outputting the user-perceivable indication that the particular data item representation should be associated with the particular cluster representation comprises:

means for outputting a user-perceivable indication that the particular data item representation should be associated with a cluster representation that has been selected by the user.

11. The system of claim 10, wherein a visual representation of a cluster comprises a visual representation of a container that encompasses one or more data item representations.

12. The system of claim 9, wherein each data item representation is selectable by the user and wherein the means for outputting the user-perceivable indication that the particular data item representation should be associated with the particular cluster representation comprises:

means for outputting a user-perceivable indication that a data item representation that has been selected by the user should be associated with the particular cluster representation.

13. The system of claim 9, wherein the user-perceivable indication that the particular data item representation should be associated with the particular cluster representation comprises:

a visual indication that the particular data item representation should be associated with the particular cluster representation.

14. The system of claim 13, wherein the visual indication that the particular data item representation should be associated with the particular cluster representation comprises:

a line connecting the particular data item representation to the particular cluster representation.

15. The system of claim 13, wherein the visual indication that the particular data item representation should be associated with the particular cluster representation comprises:

a repositioning of one or both of the particular data item representation and the particular cluster representation.

16. The system of claim 9, wherein the graphical user interface further comprises:

a visual representation of a group of data items that the user has determined should not be associated with any cluster representation; and a means for enabling the user to associate any of the data item representations with the visual representation of the group.

17. The system of claim 9, wherein the data items contain textual elements and wherein the graphical user interface further comprises:

a means for inputting a text query to be executed against each of the data items; and a means for visually identifying one or more of the data items representations that correspond to data items that are determined to match the text query.

18. The system of claim 9, wherein the input device(s) comprise a multi-touch-capable touch screen.

19. The system of claim 9, wherein the means for enabling the user to selectively associate each data item representation with any one of the cluster representations comprises:

means for enabling multiple users to contemporaneously and selectively associate each data item representation with any one of the cluster representations.

20. An assistive clustering system comprising:

a user interface that enables a user to selectively associate each of a plurality of data items with any one of a plurality of clusters;

a machine learning system that learns a clustering model based on input received from the user interface regarding data item-cluster associations made by the user; and an automatic clustering module that applies the clustering model to selectively associate unassociated data items in the plurality of data items with corresponding clusters in the plurality of clusters.

* * * * *